Figure 1:
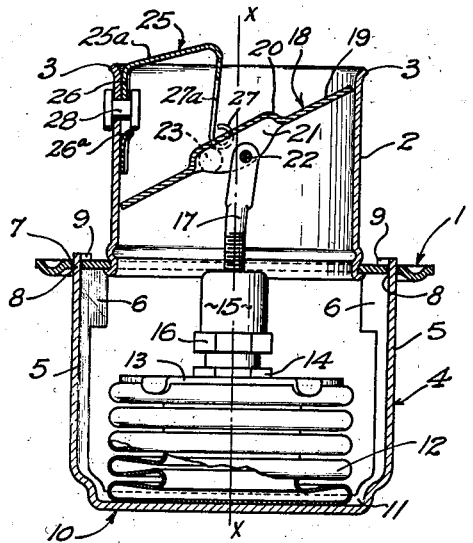

Sept. 9, 1941.　　　　S. D. FISHER　　　　2,255,543

THERMOSTAT

Filed Oct. 5, 1939

INVENTOR.
Smith D. Fisher
BY Hull, Brock & West
ATTORNEYS.

Patented Sept. 9, 1941

2,255,543

UNITED STATES PATENT OFFICE 2,255,543

THERMOSTAT

Smith D. Fisher, Cleveland, Ohio, assignor to The Bishop & Babcock Manufacturing Company, Cleveland, Ohio, a corporation of Ohio Application October 5, 1939, Serial No. 298,066

7 Claims. (Cl. 236—34)

This invention relates to thermostatically operated devices for controlling the flow of fluids and particularly relates to thermo-responsive valve devices for opening and closing fluid passages to regulate the flow of fluid therethrough, and to provide a device whereby in addition to the usual control of the fluid an additional element will be provided which permits compensation for unusual conditions due to temperature changes. In the present thermostatic device a spring means is introduced which offers added tension or an additional load to the bellows to overcome when the fluid is cold, so that the valve remains closed until a higher temperature of the fluid is obtained.

Heretofore in devices of this kind such additional tension or load was brought about by spring means which, in general, exerted increasing tension or pressure on the valve element during opening thereof, with the spring tension or pressure becoming the maximum in the open position of the valve, which tension or pressure had to be overcome by the expansion pressure of the bellows. This brought about the result that the valve would remain open only at comparatively high temperatures which are disadvantageous to the use of anti-freeze solutions.

This invention is directed to the provision of thermostatically controlled means of the character stated, which avoids the disadvantages of the prior devices above referred to, is economical to manufacture, easily installed, reliable in operation and acts automatically to reduce or remove the extra load or tension imposed upon the thermostat when such extra load is not required. More specifically, I provide a thermostat and means associated therewith for winter use effective for imposing a load on the thermostat, in the closed position of the valve, for holding the valve tightly closed and thereby reducing cold water seepage, assuring quicker heating up of the engine and higher starting temperatures, the load imposed by such means decreasing in the opening movement of the valve and becoming substantially zero in the full open position of the valve so as to avoid any objectionable obstruction to flow of the cooling liquid and resultant overheating of the cooling liquid or solution and of the engine. The means for imposing the extra load on the thermostat is so mounted as to be removed and replaced with expedition and facility and is intended primarily for winter or cold weather use, being removed during summer or warm weather.

The present invention provides additional spring means or tension for the length of time required to bring the temperature of the fluid up to the point where the heat responsive bellows element begins to push open the valve or to force the valve from its seat. The tension of the spring means is, however, removed when the valve is in the open position so that once the fluid has reached the required or predetermined temperature and the need for the additional load is removed the device hereinafter described exerts no further pressure on the valve element. The valve then remains open and the fluid is permitted free circulation.

Figure 2:
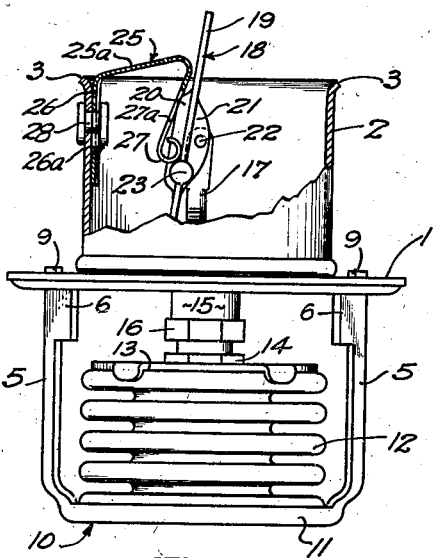
Figure 3:
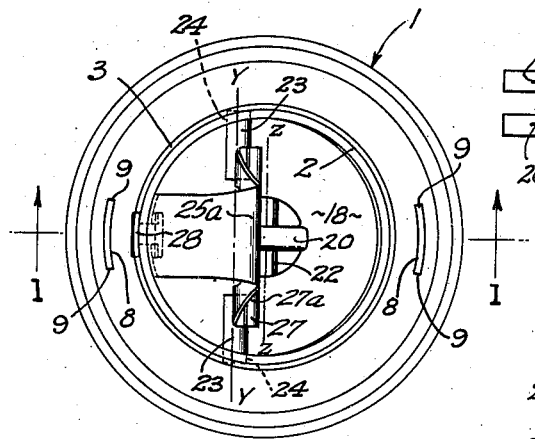
Figure 4:
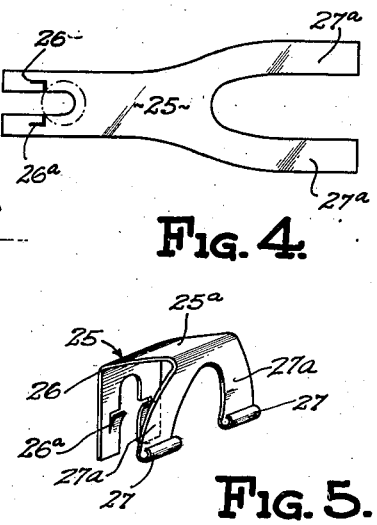
Figure 5:
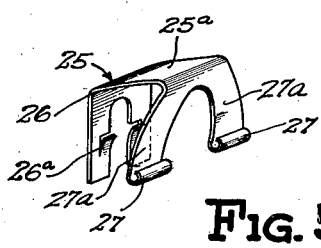

The invention is fully disclosed in the drawing in which Fig. 1 is a front elevation of the device in closed position partly broken away; Fig. 2 is an elevation of the device the same as Fig. 1 but in the open position; Fig. 3 is a plan view of the device; Fig. 4 is a developed view of the spring and Fig. 5 is a perspective view of the spring.

1 is an annular flange whereby the thermostat is held in place between parts of the engine block and hose connections not shown. Secured to the flange 1 is a vertical tubular cylindrical neck or valve seat portion 2, the upper end of which may be turned or spun to give finish or strength thereto as at 3. Suspended from the flange 1 is a generally U-shaped frame 4 comprising vertical hangers 5—5 terminating at their upper ends in enlarged heads 6. The upper terminations of which are provided with reduced tongues 7 adapted to be inserted in apertures 8 in the flange 1 and riveted over as at 9 to secure the supporting frame 4 to the flange. The lower part of the U-shaped frame 4 is an integrally formed horizontal pan 10 which is generally circular and at right angles to the vertical hangers 5—5. The pan is formed to have an annular recess, concave upwardly as at 11 and the recess forms the seat for a thermostatic bellows element 12, preferably of metal and of well known suitable form. The lower end of the bellows may be sealed in the recess by a filler of solder or similar material joining the bellows 12 and the pan 10. The upper end of the bellows is joined by a similar filler of solder to a bellows head 13 preferably formed of sheet metal and provided with an annular downwardly curved head. The head 13 has a central lower valve stem 14 sealed and secured to it in suitable manner.

The stem 14 is threaded at its upper end to receive a turnbuckle 15.

It is of course understood that the bellows may be exhausted to produce a vacuum therein and that a heat expansible gas or fluid may be admitted to the bellows for the well known purpose and that the bellows is hermetically sealed.

The turnbuckle 15 has a hexagon portion 16 to receive a wrench for adjustment purposes later referred to, and is internally bored and threaded to receive in its lower end opening the lower stem 14 and in its upper end portion the upper stem 17. The threads of the turnbuckle are left-hand with respect to the threads of the lower stem 14 so that when the turnbuckle is turned about its axis, it will adjustably draw the stem 17 downwardly or propel it upwardly for the purpose of adjustment later to be described.

The valve 18 consists of an elliptical disc 19. Formed integrally with the disc 19 is a pocket or depression 20 which has a center rib or transverse member 21. The rib 21 and the sides of the pocket 20 are perforated to hold a bearing pin 22 which passes through the upper end of the valve stem 17 at right angles thereto. The valve 18 is thus mounted upon the stem 17 at an axis parallel to its minor ellipse axis. The valve disc 19 is provided with bearing lugs or trunnions 23 which are pressed into slots provided in the disc. The trunnions 23 extend into apertures 24 of the valve portion 2. The valve disc 19 is thus mounted upon an axis parallel to its minor ellipse axis but spaced therefrom a small distance.

The valve stem 17, the turnbuckle construction and its associated parts are disposed longitudinally along the axis X—X of the tubular valve seat portion 2, and in the operation of the device to be described, the stem 17 may move longitudinally along the axis and communicate its movement to the valve 18 causing it to oscillate around the axis Y—Y of the trunnions 23. The valve 18 and its associated parts are so constructed that the axis Y—Y lies at one side of the axis X—X, and the axis Z—Z of the pin 22 lies on the opposite side of axis X—X, or may intersect the axis X—X in one or more of the positions of the axis Z—Z as it moves in an arc around the axis Y—Y in going from the closed position (Fig. 1) to the full open position (Fig. 2). The elliptical periphery of the valve 18 comes into valve closing contact of the valve seat portion 2. By means of its tubular form the valve portion 2 functions as a passage through which fluid to be controlled may flow.

Referring now particularly to Figs. 4 and 5, the leaf spring 25 has two arms 27ª the free terminal portion of each of which, in its final shape, is rolled upward to form a bearing portion or end 27. Spring 25 is of approximately inverted U-shape to provide a top portion 25ª, which is at substantially right angles to the arms 27ª, and an outer arm 26, which is at substantially right angles to portion 25ª and generally parallel to the inner arms 27ª. Arm 26 is slotted from its lower end and of generally U-shape and has fingers 26ª pressed out therefrom disposed to engage the inner head of a rivet 28 secured on valve portion 2, to prevent any upward motion of the spring when in place for operation. The spring 25 is of spring metal and the fingers 26ª may be bent back when the removal of the spring is desired. Spring 25 is mounted in operative position on neck or valve seat portion 2 by inserting arm 26 downward over the shank of rivet 28, between the adjacent wall of neck 2 and the inner head of the rivet. When the wall of arm 26 at the upper edge of the slot therein is adjacent the shank of the rivet, fingers 26ª spring inward, by their inherent resiliency, into position beneath the lower portion of the inner head of rivet 28, as shown in Figure 1. Since spring 25 is then under tension, arm 26 may move slightly upward bringing fingers 26ª into contact with the lower portion of the inner head of rivet 28. That effectively prevents upward movement of spring 25 relative to rivet 28. By moving arm 26 downward slightly and flexing fingers 26ª outward sufficiently to clear the inner head of rivet 28, spring 25 may readily be removed from neck 2 by upward movement about the shank of rivet 28. It is thus possible to mount spring 25 in operative position on neck 2 quickly and easily, for winter or cold weather use of the device, and spring 25 may as readily be removed for summer or warm weather use of the device.

The operation of the valve and spring is as follows: the fluid in the cooling systems of the engine is at the start of its operation at a low temperature and the bellows 12 is in a depressed position so that the pull on the valve element is sufficiently strong to close it and the spring element 25 exerts its pressure directly onto the valve plate 19. As the temperature of the fluid increases the bellows upon expanding will force the valve open and overcome the added tension of the spring element. As the valve plate 19 is forced upward the free end of the spring 25 will gradually change its position so that when the valve plate is in the full open position, the end 27 of the spring 25 will rest on the hinge 23 of the valve plate 19 and will exert its pressure on the hinge and not on the plate, thereby relieving the valve plate and the bellows of the additional pressure. When the valve is engaged in its closing operation the motion of the spring is reversed and it changes its position from the hinge to the valve plate. The spring 25 may be made of varying thicknesses depending on the predetermined load, so that for varying loads different springs can be furnished.

Having thus described my invention, what I claim is:

1. In a device of the character described, a tubular neck, a valve controlling said neck, means pivotally mounting said valve on said neck for oscillatory movements about an axis extending transversely thereof into open and closed positions, spring means for urging said valve in closing direction when it is closed, operating connections between said spring means and said valve shiftable relative to the latter toward and from said pivot means responsive to opening and closing of said valve, said connections being disposed at and exerting substantially all of its force on said pivot means in the full open position of said valve and being disposed to one side of said pivot means and exerting its force on said valve for urging the latter in closing direction in the full closed position of said valve, and thermo-responsive means connected to said valve for opening and closing it.

2. In a device of the character described, a tubular neck, a valve pivotally mounted on said neck for oscillatory movements about an axis extending transversely thereof into open and closed positions, spring means comprising an element slidably contacting the upper face of said valve to one side of said pivot axis when said valve is closed and in the area of said upper face which moves upward in the opening movement of said valve, said element being free from said valve for relative movement toward and away from the pivot axis thereof and moving toward said axis during opening movement of said valve and in the full open position of said valve assuming a position at said axis in which substantially all of the pressure of said spring means is exerted on said axis with substantially no effective pressure being exerted on said valve in the closing direction thereof, and thermo-responsive means connected to said valve for opening and closing it.

3. In a device of the character described, a tubular neck, a valve pivotally mounted in said neck for oscillatory movements about an axis extending transversely thereof into open and closed positions, a leaf spring secured to said neck at one side thereof and of said axis above said valve provided with a depending arm bearing on the upper face of said valve at the other side of said axis when said valve is closed, said arm being free from and having sliding contact with said valve and bearing thereon at said pivot axis thereof when said valve is in its full open position, and thermo-responsive means below and connected to said valve for opening and closing the latter.

4. In a device of the character described, a tubular neck, a valve pivotally mounted in said neck for oscillatory movements about an axis extending transversely thereof into open and closed positions, a leaf spring of approximately inverted U-shape having its outer arm secured to said neck at one side thereof and of said axis above said valve, the inner arm of said spring bearing on the upper face of said valve at the other side of said axis when said valve is closed, said inner arm being free from and having sliding contact with said valve and bearing thereon at said pivot axis thereof when said valve is in its full open position, and thermo-responsive means below and connected to said valve for opening and closing the latter.

5. In a device of the character described, a tubular neck, a valve pivotally mounted in said neck for oscillatory movements about an axis extending transversely thereof into open and closed positions, a leaf spring of approximately inverted U-shape having its outer arm secured to said neck at one side thereof and of said axis above said valve, and thermo-responsive means below and pivotally connected to said valve on an axis at the other side of and parallel with the valve pivot axis for opening and closing said valve, the inner arm of said spring bearing on the upper face of said valve between the pivot axis thereof and the pivot axis of the connection of said thermo-responsive means when said valve is closed and being free from said valve for relative sliding movement to and from the pivot axis of said valve in the opening and closing movements of the valve, said inner arm bearing on said valve at said pivot axis thereof when said valve is in its full open position.

6. In a device of the character described, a tubular neck, a valve pivotally mounted in said neck for oscillatory movements about an axis extending transversely thereof into open and closed positions, a leaf spring of approximately inverted U-shape comprising an inner arm and an outer arm, quick detachable means removably securing the outer arm of said spring to said neck at one side thereof and of said axis above said valve, the inner arm of said spring bearing on the upper face of said valve at the other side of said axis when said valve is closed, said inner arm being free from and having sliding contact with said valve and bearing thereon at said pivot axis thereof when said valve is in its full open position, and thermo-responsive means below and connected to said valve for opening and closing the latter.

7. In a device of the character described, a tubular neck, a valve pivotally mounted in said neck for oscillatory movements about an axis extending transversely thereof into open and closed positions, a mounting member extending inwardly of said neck at one side thereof and of said axis above said valve comprising a reduced shank having a head at its inner end spaced from the inner face of said neck, a leaf spring of substantially inverted U-shape having its outer arm slotted from its lower end fitting about the shank of said mounting member and provided with inwardly bent resilient fingers disposed beneath the lower portion of said head and cooperating therewith to restrain said spring against upward movement, the inner arm of said spring bearing on the upper face of said valve at the other side of said axis when said valve is closed, said inner arm being free from and having sliding contact with said valve and bearing thereon at said pivot axis thereof when said valve is in its full open position, and thermo-responsive means below and connected to said valve for opening and closing the latter.

SMITH D. FISHER.